(12) United States Patent
Taguchi et al.

(10) Patent No.: US 6,440,228 B1
(45) Date of Patent: Aug. 27, 2002

(54) LEAD-FREE ZINC-CONTAINING SOLDER PASTE

(75) Inventors: Toshihiko Taguchi, Saitama; Kunihito Takaura, Mouka; Masahiko Hirata, Kashiba; Hisahiko Yoshida, Ibaraki; Takashi Nagashima, Kyoto, all of (JP)

(73) Assignees: Senju Metal Industry Co., Ltd., Tokyo (JP); Matsushita Electric Industrial Co., Ltd., Osaka (JP)

( * ) Notice: Subject to any disclaimer, the term of this patent is extended or adjusted under 35 U.S.C. 154(b) by 9 days.

(21) Appl. No.: 09/774,011

(22) Filed: Jan. 31, 2001

(30) Foreign Application Priority Data

Feb. 4, 2000 (JP) .......................................... 2000-28034

(51) Int. Cl.⁷ ............................................. B23K 35/34

(52) U.S. Cl. ........................................................ 148/25

(58) Field of Search ........................... 148/25; 228/56.3

(56) References Cited

U.S. PATENT DOCUMENTS

| 3,655,461 A | 4/1972 | Miwa ........................... 148/23 |
| 5,904,782 A | 5/1999 | Diep-Quang ................. 148/23 |
| 6,159,304 A | * 12/2000 | Noguchi et al. ............... 148/23 |

FOREIGN PATENT DOCUMENTS

GB 912115 12/1962

* cited by examiner

*Primary Examiner*—Roy King
*Assistant Examiner*—Andrew E. Wessman
(74) *Attorney, Agent, or Firm*—Michael Tobias

(57) ABSTRACT

A solder paste having a powder of a Zn-containing solder alloy such as an Sn—Zn based alloy in admixture with a soldering flux such as a rosin flux is improved by adding from 0.1% to 5.0% by weight of a glycidyl ether compound such as alkyl, alkenyl, or aryl glycidyl ether. The improved solder paste has increased resistance to aging and to concomitant deterioration in solderability caused by reaction of Zn in the solder alloy with ingredients in the flux and has a substantially extended shelf life.

7 Claims, 1 Drawing Sheet

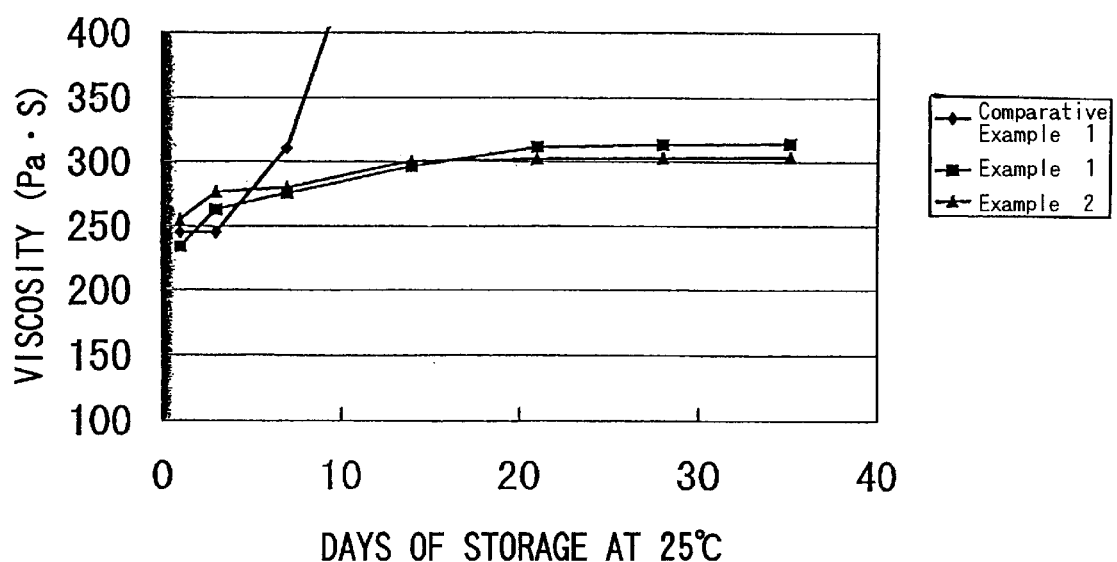

LEAD-FREE ZINC-CONTAINING SOLDER PASTE

BACKGROUND OF THE INVENTION

The present invention relates to a solder paste and more particularly to a lead-free, zinc-containing solder paste which comprises a powder of a zinc-containing, lead-free solder alloy in admixture with a soldering flux.

Sn—Pb alloys have been used in soldering since ancient times, and they are still the most popular solders for soldering electronic components to printed circuit boards or other substrates.

Sn—Pb alloys have a eutectic composition of approximately 63% Sn with a balance of Pb. This composition has a low melting temperature of 183° C., thereby making it possible to perform soldering in a temperature range of from 220° C. to 230° C., in which range there is no substantial thermal damage to heat-sensitive electronic components. The eutectic Sn—Pb alloy, called eutectic solder, has extremely good wettability and solderability, and since it does not have a difference between its liquidus and solidus temperatures (i.e., no solidification temperature range exists), solidification occurs instantaneously during soldering when the melting point is reached. As a result, even if vibrations or mechanical shocks are applied to parts to be soldered during soldering, cracking or detachment of the resulting soldered joints does not occur.

Discarded electronic appliances including televisions, radios, audio or video recorders, computers, copying or printing machines, etc. are generally disposed of in landfills, since such appliances are composed of various materials such as synthetic resins used for housings and printed circuit boards, and metals used for wires and other electric connections and frames, which are not suitable for disposal by incineration.

In recent years, the phenomenon of acid rain has become serious due to discharge of sulfur oxide into the atmosphere by extensive use of fossil fuels such as gasoline and fuel (heavy) oils. Acid rain penetrates into the ground and causes dissolution of the solders present in discarded electronic appliances buried in the landfills, thereby producing contamination of the groundwater with lead. If such contaminated groundwater is ingested by people for many years, the accumulation of lead in their bodies may result in lead poisoning (plumbism).

From this viewpoint, it has been desired in the electronics industry to use a lead-free solder alloy for soldering electronic components. Conventional lead-free solder alloys are Sn-based alloys such as Sn—Ag, Sn—Sb, Sn—Bi, and Sn—Zn alloys.

Sn—Ag alloys form a eutectic composition of Sn-3.5Ag, but the melting temperature, i.e., eutectic temperature of this composition is relatively high (221° C.). Even if this eutectic composition having the lowest melting temperature among Sn—Ag alloys is used as a solder alloy, the soldering temperature will be as high as from 260° C. to 270° C., which may cause thermal damage to heat-sensitive electronic components during soldering, thereby deteriorating or even destroying their functions.

Of Sn—Sb alloys, an Sn-5Sb alloy has the lowest melting temperature, but its melting temperature is as high as 235° C. on the solidus line and 240° C. on the liquidus line. Therefore, its soldering temperature is in the range of from 280° C. to 300° C., which is still higher than that of an Sn-3.5Ag alloy, and thermal damage to heat-sensitive electronic devices cannot be avoided.

Sn—Bi alloys have a eutectic composition of 42% Sn—Bi with a melting temperature of 139° C., which is considerably lower than that of the above-described conventional Sn—Pb eutectic solder (183° C.). Therefore, Sn—Bi alloys may be considered to be potentially usable as lead-free solders from the viewpoint of melting temperatures. However, Sn—Bi alloys are too brittle and hard to meet the mechanical properties such as tensile strength and elongation that are required for solder alloys.

Sn—Zn alloys have a eutectic composition of Sn-9% Zn with a melting temperature of 199° C. This eutectic composition is advantageous in that its melting temperature is close to that of conventional Sn—Pb eutectic solder (183° C.). Another advantage of Sn—Zn alloys is that their mechanical properties are superior to those of Sn—Pb alloys. However, Sn—Zn alloys have poor solderability.

In order to improve the solderability of Sn—Zn alloys and further enhance their mechanical properties, a number of solder alloys based on an Sn—Zn alloy and containing one or more additional elements such as Ag, Cu, Bi, In, Ni, and P have been proposed.

With these improved Sn—Zn based solder alloys containing one or more additional elements, a considerably satisfactory solderability can be achieved as long as these alloys are used in the form of wire solder for soldering with a soldering iron along with an appropriate soldering flux. However, when these Sn—Zn based solder alloys are used in the form of a solder paste, which is a mixture of a powder of such a solder alloy and a soldering flux in a viscous fluid, they do not work successfully or not exhibit satisfactory solderability. Thus, a solder paste formed from an Sn—Zn based solder alloy may cause non-wetting or dewetting during soldering whereby the areas of a substrate to be soldered are not wetted by the solder completely and have solder balls thereon. Even though the solder after soldering appears by visual observation to be sound or wet the areas completely, it may contain internal pit-like voids at the interface between the solder and the substrate, as can be seen when the solder is peeled off.

The solderability of a solder paste formed from an Sn—Zn based solder alloy can be improved by using an activated flux containing a strong activator which can effectively enhance the spreading of the molten solder alloy. However, the strong activator can react with zinc (Zn) present in the solder alloy to oxidize or corrode it in a short period of time and cause the solder to lose its metallic nature, resulting in a significant deterioration in solderability. Thus, a solder paste formed from an Sn—Zn based solder alloy or other Zn-containing solder alloy (such a solder paste being hereinafter referred to as "Zn-containing solder paste) generally suffers the problem of detrimental alterations, i.e. aging, after storage for a relatively short period.

The detrimental alterations with time (hereinafter referred to as aging) of a Zn-containing solder paste appear as a change in viscosity. Thus, a Zn-containing solder paste immediately after it is prepared has an appropriate viscosity which makes it easy to stir with a spatula or stirring rod and which is suitable for application by screen printing or feeding with a dispenser. However, after it is stored for a certain period of time on the order of one or two weeks, it has an increased viscosity due to aging and is difficult to stir.

When such an aged solder paste having an increased viscosity is applied to a printed circuit board by screen printing or with a dispenser and then heated in a reflow furnace, the solder may not entirely melt or a large quantity of oxides formed in the solder alloy may cause the formation of solder balls as the solder melts. Even with a freshly prepared Zn-containing solder paste, if reflow soldering is conducted in an oxygen-containing atmosphere such as air, the molten solder may not spread adequately and good solderability may not be obtained. Therefore, reflow soldering must be performed in an inert gas atmosphere, thereby adding to operating costs.

SUMMARY OF THE INVENTION

It is an object of the present invention to provide a Zn-containing solder paste which is less susceptible to aging and has an extended shelf life.

It is another object of the invention to provide a Zn-containing solder paste which exhibits satisfactory solderability when reflow soldering is performed in air.

It has been found that the addition of a glycidyl ether compound to a flux used to prepare a Zn-containing solder paste has an effect of stabilizing the resulting solder paste against aging and improving the solderability of the solder paste, although the mechanism for this effect has not been clearly elucidated.

Such a favorable effect of the glycidyl ether compound on stability and solderability of a solder paste is prominent particularly with Zn-containing solder pastes, but it can be achieved to some extent with other solder pastes. Thus, the addition of a glycidyl ether compound to a flux is generally effective in all kinds of solder pastes in order to retard aging and improve solderability.

According to one aspect of the present invention, a solder paste comprises a powder of a solder alloy, preferably of a lead-free solder alloy, in admixture with a soldering flux with a glycidyl ether compound being added to the soldering flux.

More particularly, the present invention provides a lead-free solder paste comprising a powder of a zinc-containing, lead-free solder alloy in admixture with a soldering flux (namely, a Zn-containing solder paste) wherein a glycidyl ether compound is added to the soldering flux, preferably in an amount of from 0.1% to 5.0% by weight of the flux.

The glycidyl ether compound is a compound having at least one glycidyl ether moiety

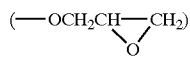

in the molecule.

In a preferred embodiment, the Zn-containing solder alloy is an Sn—Zn based alloy including an Sn—Zn alloy, and more preferably an Sn—Zn-Bi alloy.

In accordance with the present invention, a Zn-containing solder paste, which has been considered to have a shelf life of approximately one week when stored at 25° C. or below, can be stored for 4 weeks or longer without a significant aging, thereby facilitating the practical use of Zn-containing solder pastes.

BRIEF DESCRIPTION OF THE DRAWING

The attached drawing is a graph showing the change as a function of time in the viscosity of Zn-containing solder pastes prepared in the Examples during storage at 25° C.

DESCRIPTION OF PREFERRED EMBODIMENTS

The aging of a conventional Zn-containing solder paste during storage occurs due to the high reactivity of Zn with an acid or alkali which is normally present in the flux as an activator or other additive, whereby Zn is selectively corroded (oxidized) in the solder paste. The Zn-containing solder alloy in a solder paste is in the form of a fine powder having an increased surface area, which accelerates the corrosion of Zn. The addition of a glycidyl ether compound to the soldering flux used to form a Zn-containing solder paste according to the present invention can stabilize the solder alloy against corrosion and retard aging of the solder paste.

The aging of a solder paste appears as deteriorations in various properties of the solder paste with time. Particularly in the case of a Zn-containing solder paste, such deteriorations can be evaluated by an increase in viscosity of the solder paste.

In the context of the present invention, the solderability of a solder paste is evaluated by the degree of spreading and the formation of solder balls when the paste is applied to a substrate and heated in a reflow furnace in air or other oxygen-containing atmosphere.

As described previously, these properties of conventional Sn—Zn solder alloys have been improved by addition of one or more elements such as Ag, Bi, In, Ni, and P to the alloys. This approach is successful when these alloys are used in the form of wire solder for soldering with a soldering iron, but it is not effective when the alloys are used in the form of solder pastes. It was difficult in the prior art to use a solder paste comprising an Sn—Zn or other Zn-containing solder alloy due to rapid aging and concomitant increase in viscosity and deterioration in solderability. The present invention can effectively retard the aging of such a solder paste and facilitates practical use thereof.

The Zn-containing solder alloy used in the solder paste according to the present invention may be any Zn-containing solder alloy, but it is preferably an Sn—Zn based solder alloy. An Sn—Zn based solder alloy is normally comprised predominantly of Sn (tin) and contains Zn (zinc), and it may optionally contain one or more additional alloying elements. Non-limiting examples of Sn—Zn based solder alloys include Sn—Zn alloys such as an Sn-9%Zn alloy, Sn—Zn-Bi alloys such as an Sn—8%Zn-3%Bi alloy, Sn—Zn—Ag alloys such as an Sn—9%Zn—0.2%Ag alloy, and Sn—Zn—Bi—Ag alloys such as an Sn—8%Zn—11%Bi—0.1%Ag alloy.

As described above, the concept of the present invention can be applied to other solder alloys such as conventional Sn—Pb solder alloys, Sn—Ag solder alloys, and Sn—Bi alloys. Thus, solder pastes of these solder alloys can be improved with respect to aging by adding a glycidyl ether compound to the flux used to form the solder paste. However, the improvement is particularly significant in Zn-containing solder pastes since they are highly susceptible to aging as discussed above.

Generally, a powder of a solder alloy used to form a solder paste may be prepared by the gas atomizing or centrifugal atomizing technique. The average particle diameter of the powder is usually in the range of from 200 to 400 mesh or even smaller.

The soldering flux which is admixed with a powder of a Zn-containing solder alloy to form a solder paste and to which a glycidyl ether is added is not limited to a specific class, and it may be the same as those which have been used in conventional solder pastes, e.g., those pastes containing a powder of an Sn—Pb eutectic solder alloy.

A typical flux used in a solder paste is a rosin flux. Also in the solder paste according to the present invention, it is preferable to use a rosin flux as a soldering flux, although other soldering fluxes, particularly non-water soluble fluxes such as those based on a synthetic resin may be used.

The rosin flux used in the present invention is preferably an activated rosin flux which contains an activator. An activated rosin flux comprises a rosin as a main ingredient and minor amounts of an activator and optionally one or more other additives such as a thixotropic agent, these ingredients being dissolved in a solvent. The rosin may be a natural rosin, also called colophony, or a modified rosin, or a mixture of these. Useful activators are amine hydrohalides, particularly amine hydrobromides such as diphenylguanidine hydrobromide, cyclohexylamine hydrobromide, triethanolamine hydrobromide, and the like, although other activators may be used. Non-limiting examples of the thixotropic agent are hardened castor oil and fatty acid amides such as stearamide. Non-limiting examples of the solvent are α-terpineol and alkylene glycol ethers such as diethylene glycol monohexyl ether.

A typical composition of an activated rosin flux on a weight basis is as follows:

40%–60% of a rosin and/or a modified rosin,
3%–8% of a thixotropic agent,
0.5%–3% of an activator, and
30%–50% of a solvent.

Each of these ingredients may be comprised of one or more compounds. Other additives including a co-activator such as an organic halide compound may be present in the rosin flux.

In accordance with the present invention, a glycidyl ether compound is added to the soldering flux during or after the preparation of the flux. The flux is then uniformly admixed with a powder of a Zn-containing solder alloy to prepare a solder paste. The resulting solder paste has improved resistance to aging and improved solderability. Thus, the solder paste can be stored for a prolonged period, e.g., 4 weeks or more, without substantial detrimental alterations such as an increase in viscosity, and can be used in reflow soldering in air to form satisfactory soldered joints.

Preferably, the glycidyl ether compound has the following general formula (I):

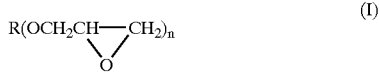

where R is a saturated or unsaturated, aliphatic or aromatic hydrocarbon group which may optionally contain at least one hydroxyl group, and n is an integer from 1 to 4.

The aliphatic hydrocarbon group includes a cyclic aliphatic hydrocarbon groups. When R is a monovalent group, it may be an alkyl group, preferably having 3 to 20 carbon atoms, such as propyl, n-butyl, sec-butyl, amyl, hexyl, 2-ethylhexyl, 2-methyloctyl, decyl, dodecyl, tridecyl, or stearyl; an alkenyl group such as allyl; or an aryl group such as phenyl, naphthyl, biphenyl, or tolyl.

Non-limiting examples of the compound of Formula (I) having a monovalent R group (n=1) include allyl glycidyl ether, propyl glycidyl ether, n-butyl glycidyl ether, phenyl glycidyl ether, biphenyl glycidyl ether, tolyl glycidyl ether, 2-ethylhexyl glycidyl ether, sec-butyl phenyl glycidyl ether, 2-methyloctyl glycidyl ether, dodecyl glycidyl ether, stearyl glycidyl ether, and the like. Non-limiting examples of the compound of Formula (I) having a polyvalent R group (n≧2) include ethylene glycol diglycidyl ether, sorbitol polyglycidyl ether, glycerol triglycidyl ether, trimethylolpropane polyglycidyl ether, and the like.

The glycidyl ether compound is preferably added to the soldering flux in an mount of 0.1% to 5.0% by weight based on the flux. Of course, two or more glycidyl ether compounds may be added together in a total amount of 0.1% to 5.0% by weight. If the amount is less than 0.1% by weight, a substantial improvement in resistance to aging and in solderability cannot be obtained. Addition of more than 5% by weight of the glycidyl ether compound has an adverse effect on solderability. Preferably the glycidyl ether compound is added to the flux in an amount of 1.0% to 3.0% and more preferably 1.5% to 3.0% by weight.

In the solder paste according to the present invention, the proportions of the soldering flux and the Zn-containing solder alloy powder in a solder paste are not critical but they are usually in the range of from 5% to 50% and preferably from 5% to 30% of the soldering flux and from 95% to 50% and preferably from 95% to 70% of the solder alloy powder on a weight basis.

The Zn-containing solder paste according to the present invention has improved resistance to aging. Therefore, it can be stored for a prolonged period while keeping its viscosity within such a range that the solder paste can be smoothly applied by screen printing or with a dispenser and without a substantial deterioration in solderability. As a result, the stored solder paste can be subjected to reflow soldering with little or no formation of solder balls or oxides of the solder alloy, thereby achieving reflow soldering with a Zn-containing solder paste in a reliable manner.

Since a Zn-containing solder alloy is capable of having a melting point close to that of the most common Sn—Pb eutectic solder alloy, Zn-containing solder pastes can be used to perform reflow soldering in a reflow furnace designed for reflow soldering with conventional Sn—Pb solder pastes. Thus, Zn-containing solder pastes are advantageous in that they make it possible to perform lead-free reflow soldering in existing reflow soldering facilities. However, due to their short storage period of about one week or so, the application of Zn-containing solder pastes has been limited in the prior art. The present invention can eliminate or alleviate this limitation of Zn-containing solder pastes.

The following examples are presented to further illustrate the present invention. These examples are to be considered in all respects as illustrative and not restrictive. In the examples, all percentages are by weight unless otherwise indicated.

EXAMPLES

In each of the following examples, solder pastes consisting of 10% of a oldering flux and 90% of a solder alloy powder were prepared by thoroughly mixing these two constituents. The fluxes used in the examples had the compositions shown in Table 1. The solder alloy powder was a powder of a Zn-containing alloy having the composition: Sn—8%Zn—3%Bi. The resulting solder pastes were evaluated with respect to aging (increase in viscosity) and solderability (reflowing properties) in the manner described below.

Testing Method for Aging

A freshly prepared solder paste to be tested was stored in a thermostatic chamber at 25° C. for maximum 5 weeks while the viscosity of the paste was determined at regular intervals. The resistance to aging of the solder paste was evaluated by the length of time before the viscosity of the solder paste increased to 350 pascal-seconds [Pa·s] or higher, which is no longer suitable for use by screen printing or with a dispenser, and ranked as follows:

⊚ (Excellent): Four weeks or more,
○ (Good): Two weeks or more but less than four weeks,
X (Poor): Less than two weeks.

Thus, the above-mentioned length of time is indicative of the shelf life of the solder paste.

Testing Method for Solderability

Solderability was tested by applying a solder paste to be tested, which was either freshly prepared or stored as above, to a printed circuit board and heating at 230° C. in air to simulate heating in a reflow furnace in air. The solderability was evaluated by the reflowing properties during heating by observing the conditions of spreading of the solder on the boards and the formation of solder balls due to oxidation of the solder alloy to form infusible oxides and ranked as follows:

⊚ (Excellent): No solder balls observed,
○ (Good): Some solder balls observed,
X (Poor): Little or no melting.

Table 1 shows, in addition to the composition of the soldering flux used in weight percent, the resistance to aging as evaluated above and the solderability after storage for 7 days.

The change in viscosity with time of the solder pastes of Examples 1 and 2 and Comparative Example 1 during storage for 35 days is shown in the attached drawing. The change in the solderability (reflowing properties) with time until storage for 25 days is given in Table 2.

TABLE 1

| Ingredient of flux with figures in wt % or items tested with results on the 7th day | Example 1 | Example 2 | Example 3 | Example 4 | Comparative Example 1 | Comparative Example 2 |
|---|---|---|---|---|---|---|
| Polymerized rosin | 44 | 41 | 45.5 | 43 | 46 | 39 |
| Diphenylguanidine HBr | 2 | 2 | 2 | 2 | 2 | 2 |
| Hardened castor oil | 5 | 5 | 5 | 5 | 5 | 5 |
| Phenyl glycidyl ether | 2 | 5 | — | — | — | 7 |
| 2-ethylhexyl glycidyl ether | — | — | 0.5 | 3 | — | — |
| 2,3-dibromo-1-propanol | 2 | 2 | 2 | 2 | 2 | 2 |
| α-terpincol | 45 | 45 | 45 | 45 | 45 | 45 |
| Change in viscosity | ⊚ | ⊚ | ○ | ⊚ | X | ⊚ |
| Solderability (Reflowing) | ⊚ | ○ | ⊚ | ⊚ | ○ | X |

TABLE 2

| Example Number | Solderability after stored for the indicated days | | | | |
|---|---|---|---|---|---|
| | Initial (day 0) | 3 days | 7 days | 14 days | 25 days |
| Comparative Example 1 | ⊚ | ○ | ○ | X | X |
| Example 1 | ⊚ | ⊚ | ⊚ | ⊚ | ⊚ |
| Example 2 | ○ | ○ | ○ | ○ | ○ |

As can be seen from the drawing and Table 1, the Zn-containing solder pastes of Examples 1 and 2 formed from an activated rosin flux to which a glycidyl ether compound was added showed a very slow increase in viscosity with time, and their viscosities remained at a level suitable for use by screen printing or with a dispenser after storage for 35 days.

In contrast, the Zn-containing solder paste of Comparative Example 1, which illustrates a conventional solder paste formed from an activated rosin flux, showed a rapid increase in viscosity with time. Its viscosity exceeded 300 pascal-seconds on the seventh day and soon after increased to 350 pascal-seconds or higher which is no longer suitable for use. As can be seen from Tables 1 and 2, such a solder paste having an increased viscosity showed deteriorated solderability with the formation of fine solder balls or of an oxidized alloy. Such deteriorated solderability was already observed approximately on the third day.

Thus, it is apparent that the addition of a glycidyl ether compound to a flux used to form an Zn-containing solder paste is effective for retarding aging of the solder paste and concomitant deterioration of the solderability thereof, thereby providing the solder paste with a significantly extended shelf life.

However, the glycidyl ether compound, if added in an excessively large amount, adversely affects the solderability of the solder paste, as shown in Comparative Example 2.

It will be appreciated by those skilled in the art that numerous variations and modifications may be made to the invention as described above with respect to specific embodiments without departing from the spirit or scope of the invention as broadly described.

What is claimed is:

1. A lead-free solder paste comprising a powder of a zinc-containing, lead-free solder alloy in admixture with a soldering flux with a glycidyl ether compound being added to the soldering flux in an amount of from 0.1% to 5.0% by weight based on the flux.

2. The lead-free solder paste according to claim 1 wherein the glycidyl ether compound has the following formula:

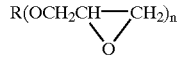

where R is a saturated or unsaturated, aliphatic or aromatic hydrocarbon group which optionally contain at least one hydroxyl group, and n is an integer from 1 to 4.

3. The lead-free solder paste according to claim 1 wherein the zinc-containing solder alloy is an Sn—Zn based solder alloy.

4. The lead-free solder paste according to claim 3 wherein the zinc-containing solder alloy is an Sn—Zn—Bi based solder alloy.

5. The lead-free solder paste according to claim 1 wherein the soldering flux is a rosin flux.

6. The lead-free solder paste according to claim 5 wherein the rosin flux is an activated rosin flux containing an activator.

7. The lead-free solder paste according to claim 6 wherein the activated rosin flux contains a thixotropic agent.

* * * * *